March 1, 1960 R. L. WILSON ET AL 2,926,965
FLUID PRESSURE BRAKE APPARATUS
Filed Feb. 27, 1956
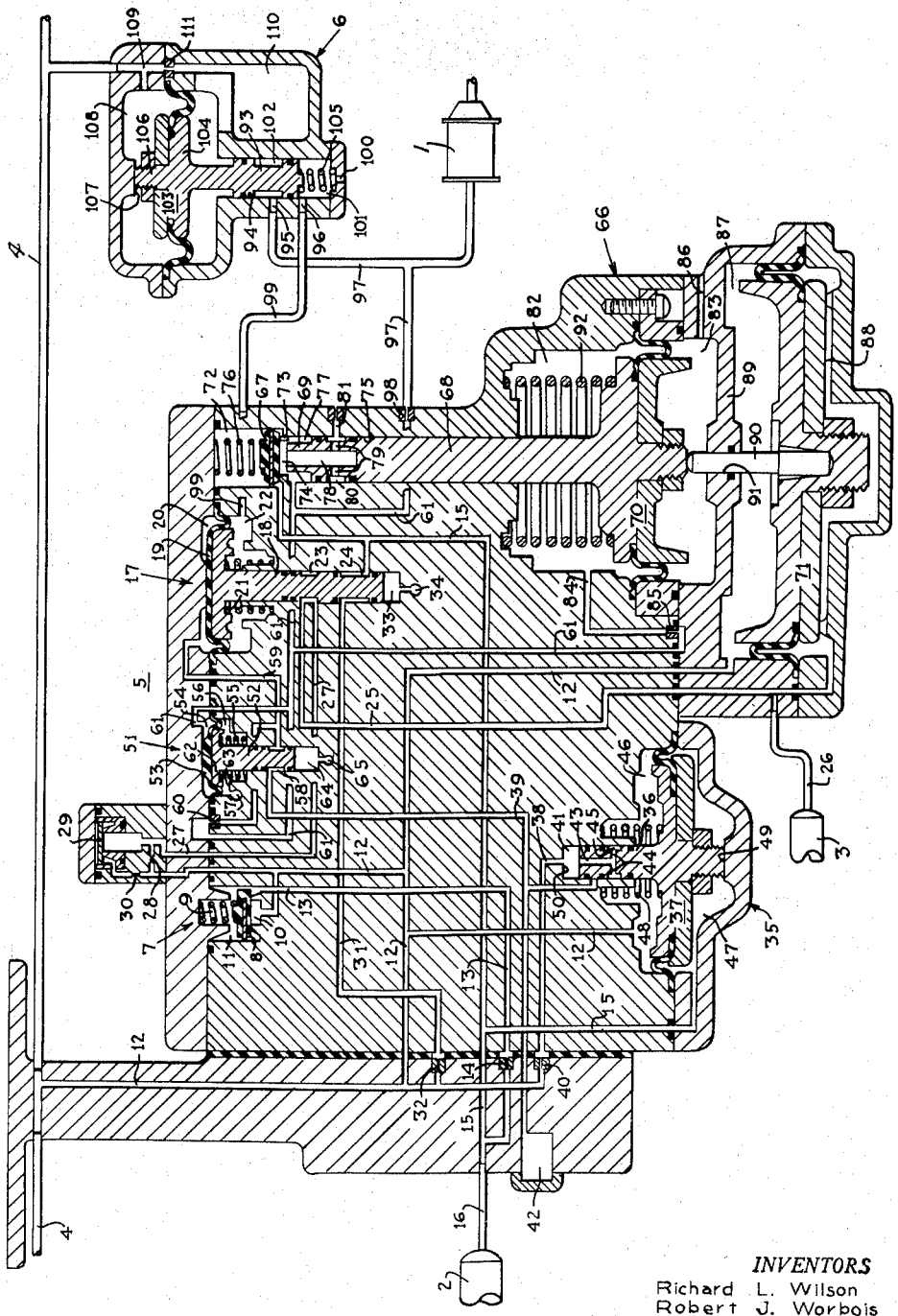
INVENTORS
Richard L. Wilson
Robert J. Worbois
BY
Adelbert A. Steinmiller
ATTORNEY

United States Patent Office 2,926,965
Patented Mar. 1, 1960

2,926,965

FLUID PRESSURE BRAKE APPARATUS

Richard L. Wilson, Pittsburgh, and Robert J. Worbois, Irwin, Pa., assignors to Westinghouse Air Brake Company, Wilmerding, Pa., a corporation of Pennsylvania Application February 27, 1956, Serial No. 567,838

7 Claims. (Cl. 303—36)

This invention relates to fluid pressure brake control apparatus, and more particularly to fluid pressure brake control apparatus for controlling application and release of the brakes on a railway car.

The prime object of the present invention is to provide a fluid pressure brake control apparatus for railway cars which may be conditioned selectively for effecting, responsively to restoration in brake pipe pressure following a brake application, either a direct release for prompt and full release of the brakes, or a graduated release where partial application of the brakes is retained and the degree of release of the brakes is dependent upon the degree of such restoration.

It is another object of the present invention to provide a fluid pressure railway car brake apparatus as set forth in the preceding paragraph wherein the condition for selection of graduated or direct release effected by such apparatus may be established remotely by variation in the rate of restoration in brake pipe pressure.

Other objects and advantages of the invention will become apparent from the following more detailed description of such invention when taken in connection with the accompanying drawing in which the single figure is a schematic representation showing in cross section a fluid pressure brake control apparatus embodying the invention.

Description

Referring to the drawing, the improved fluid pressure brake control apparatus comprises the usual brake cylinder device 1 which will respond to the degree of build-up or reduction in pressure of fluid supplied thereto to effect a corresponding degree of braking of such as wheels on a railway vehicle through the medium of the usual brake shoes and rigging (not shown); a supply reservoir 2 for storing the fluid under pressure which is supplied to the brake cylinder device 1 during application of the brakes on the vehicle; a control reservoir 3 for storing fluid at a datum pressure; the usual brake pipe 4 which extends through a train for conveying fluid under pressure to and from an engineer's brake valve device (not shown) located on the locomotive of such train; a brake controlling valve device 5 which comprises means for effecting charging of the supply and control reservoirs 2 and 3, means for effecting local quick service withdrawal of fluid under pressure from the brake pipe, means for effecting supply of fluid under pressure from the supply reservoir 2 to the brake cylinder device 1 during application of the brakes and a release of fluid under pressure from said brake cylinder device following such application; and a selector valve device 6 operable to selectively condition the brake controlling valve device 5 for effecting either a direct or a graduated release of the brakes as desired.

To provide for substantial charging and recharging of the supply reservoir 2, the brake controlling valve device 5 comprises a supply reservoir charging check valve device 7 which includes a check valve 8 urged by a light bias spring 9 to permit only one-way flow between a fluid pressure inlet chamber 10 and an outlet chamber 11. The inlet chamber 10 is in constantly open communication with the brake pipe 4 by way of branches of a brake pipe passage 12, while the outlet chamber 11 is in constantly open communication with the supply reservoir 2 by way of a passage 13, a supply reservoir charging choke 14, branches of a supply reservoir passage 15, and a pipe 16.

During initial charging and during recharging of the supply reservoir 2, at any time that the pressure of fluid in the brake pipe 4 exceeds pressure of fluid in the supply reservoir 2 to a slight degree, such as one and seven-tenths pounds, sufficient to unseat the check valve 8 against opposition of the light bias spring 9, fluid under pressure will flow from the brake pipe 4 to the supply reservoir by way of the passage 12, chamber 10, the unseated valve 9, chamber 11, passage 13, choke 14, passage 15, and the pipe 16 to charge said supply reservoir 2 to substantially brake pipe pressure.

For controlling a charging and equalizing communication between the brake pipe and the suply and control reservoirs 2 and 3, the brake controlling valve device 5 is provided with a cut-off valve device 17 comprising reservoir isolating valve means in the form of a stem type slide valve 18 operably attached to a diaphragm 19 which is subject opposingly to pressure of fluid in a control chamber 20 on its one side and force of a spring 21 disposed in a normally non-pressurized chamber 22 on its opposite side.

The slide valve 18 comprises axially spaced apart annular grooves 23 and 24 for establishing fluid pressure communications between the brake pipe 4 and the control and supply reservoirs 3 and 2, respectively.

The groove 23 is arranged to be in communication with the control reservoir 3 by way of a passage 25 and a pipe 26 in an open position of the valve 18 in which it is shown in the drawing. In open position of valve 18, such groove 23 also is arranged to be open to the brake pipe 4 by way of a brake pipe passage 27, a control reservoir charging and overcharge dissipating choke 28, and a branch of the brake pipe passageway 12 connected without restriction to said brake pipe. In addition, fluid under pressure is free to flow from passage 27 to passage 12 also by way of a check valve 29 and a choke 30 in parallel with the choke 28, for reasons which hereinafter will become apparent.

The groove 24 in slide valve 18 is arranged to be in open communication with the supply reservoir 2 by way of a branch of the passage 15 and the pipe 16 connected to said reservoir, and, in open position of said valve in which it is shown in the drawing, the groove 24 is arranged to be also in fluid pressure communication with the brake pipe 4 by way of a brake pipe passage 31, a supply reservoir final charge and overcharge dissipation choke 32, and the brake pipe passage 12. The clearance volume 33 at the end of valve 18 is vented to the atmosphere by way of a port 34, to prevent any build-up in pressure in such volume which would interfere with valve movement.

As will be set forth hereinafter in detail, the chamber 22 in the cut-off valve device 17 is adapted to be connected selectively to either the atmosphere or to the brake cylinder. The value of the spring 21 in the chamber 22 and the area of the diaphragm 19 are such that such device is responsive to a slight increase in pressure of fluid in the chamber 20 above atmospheric pressure, to the extent of about one pound, for example, when the chamber 22 is vented to the atmosphere, to move the slide valve 18 to a closed position defined by engagement of said valve with the end wall of clearance volume 33. In such closed position of the slide valve 18, the grooves 23 and 24 will be disposed out of registry with control reservoir passage 25 and brake pipe passage 31, respectively, to disestablish communication thereby between the brake pipe and the control and supply reservoirs 3 and 2, by way of passages 25 and 15, respectively.

For effecting quick service withdrawal of fluid under pressure locally from the brake pipe 4 on a particular car employing the subject brake equipment, the brake controlling valve device is provided with a quick service valve device 35 which includes a stem type slide valve 36 operably connected to a diaphragm motor assemblage 37 to control fluid pressure communication between a brake pipe passage 38 and a quick service passageway 39; the brake pipe passageway 38 being in constantly open communication at its one end with the brake pipe passage 12 by way of a quick service control choke 40, and at its opposite end with a clearance chamber 41 at one end of the slide valve 36, while the quick service passage 39 is constantly open to a quick service volume chamber 42.

The slide valve 36 includes a central passage 43 which extends in an axialwise direction from the clearance chamber 41 into communication, via radial ports 44, with an annular groove 45 formed in the outer periphery of said valve for registry with the passage 39.

The diaphragm motor assemblage 37 is subject opposingly on its opposite faces, respectively, to pressures of fluid in a brake pipe pressure chamber 46 and a supply reservoir pressure chamber 47. A light compression spring 48, disposed in the brake pipe pressure chamber 46, cooperates with the diaphragm motor assemblage 37 and attached slide valve 36 to urge same toward a repose position in which groove 45 is blanked off from passage 39 and in which position they are shown in the drawing as defined by engagement of a portion of said assemblage with a casing shoulder 49. An opposite quick service position of the diaphragm motor assemblage 37 and slide valve 36 in which groove 45 is open to passage 39 is defined by engagement of said slide valve with an end wall 50 of the chamber 41.

For controlling venting of the quick service volume chamber 42 and initial pressurization of the control chamber 20 in the cut-off valve device 17, the brake controlling valve device 5 includes an interlock valve device 51 which comprises a stem type slide valve 52 operably attached to a diaphragm 53 which is subject opposingly to pressure of fluid in a control chamber 54 on one side and force of a compression spring 55 disposed in a non-pressure chamber 56 on its opposite side, the latter chamber being constantly open to the atmosphere by way of a vent port 57.

The slide valve 52 comprises an annular groove 58 for establishing communication between a branch of the quick service passage 39 and a passage 59 which is constantly open without restriction to the control chamber 20 in the cut-off valve device 17, and, via a choke 60, is also constantly open to the brake cylinder device 1 via a passage 61 and other communication means to be set forth hereinafter.

The control chamber 54 in the device 51 is constantly connected to a branch of the brake cylinder passage 61, and the value of the spring 55 relative to the area of the diaphragm 53 is such that the slide valve 52 will be held disposed in the position in which it is shown in the drawing so long as brake cylinder pressure in the chamber 54 is below a certain value such as five pounds, for example. The slide valve 52 will be actuated to a quick service cut-off position, defined by engagement of a valve-attached diaphragm follower member 62 with a casing shoulder 63, when brake cylinder pressure in chamber 54 increases above said certain value. In the quick service cut-off position of valve 52, a groove 58 therein is out of registry with the passage 39 to disestablish communication between said passage 39 and the passage 59, for reasons which hereinafter will become apparent.

The clearance volume 64 at the end of slide valve 52 in the device 51 is vented to the atmosphere by way of a port 65.

For controlling supply of fluid under pressure from the supply reservoir 2 to the brake cylinder device 1, the brake controlling valve device 5 includes a service valve device 66 which comprises a brake cylinder supply and release valve 67, an actuating stem 68 having a release valve seat element 69 formed therein for cooperation with valve 67, and movable abutment means in the form of diaphragm motor assemblages 70 and 71 operably associated with the stem 68.

Supply and release valve 67 is disposed in a supply chamber 72 which is constantly open to the supply reservoir 2 by way of the supply reservoir passage 15. The valve 67 is cooperable with a valve seat 73 to control communication between the supply chamber 72 and the brake cylinder passage 61 by way of a port 74 encircled by the valve seat 73 at the end of a bore 75 which continues from such port and in which the actuating stem 68 is disposed in slidably guided sealed cooperation with the wall thereof. A light compression spring 76 is disposed in the chamber 72 and arranged to bias the valve 67 toward its seat 73.

The end of the actuating stem 68 in which the release valve seat element 69 is formed, is reduced in cross section to provide an annular clearance passage 77 between the wall of the port 74 and of the bore 75 to afford a path for flow of fluid under pressure from chamber 72 to the brake cylinder passage 61 when valve 67 is held unseated against opposition of the spring 76 by engagement with the seat element 69. A brake cylinder release passage 78 is formed in stem 68 which opens through its projecting end in encirclement by seat element 69 and extends therefrom in an axial direction into intersection with a plurality of radial ports 79 opening into a groove 80 formed on the outer periphery of said stem. The groove 80 is arranged in stem 68 to be opened to an exhaust passage 81 at least when seat element 69 is disposed away from the valve 67; the exhaust passage 81 being open at one end through the wall of the bore 75 and at its opposite end to the atmosphere.

The diaphragm motor assemblage 70 is operably attached to the stem 68 directly and is subject opposingly on its opposite faces to pressure of fluid in a brake cylinder pressure chamber 82 into which said stem extends and to atmospheric pressure in a non-pressure chamber 83.

Brake cylinder pressure chamber 82 is constantly open to a branch of the brake cylinder passage 61 by way of a passage 84 and a stabilizing choke 85, and the non-pressure chamber 83 is constantly open to the atmosphere by way of a port 86.

The diaphragm motor assemblage 71 is subject opposingly on its opposite faces, respectively, to pressure of fluid in a brake pipe pressure chamber 87 constantly open to the brake pipe passage 12, and to pressure of fluid in a control reservoir pressure chamber 88, which is constantly open to the control reservoir passage 25. A partition 89 separates the brake pipe pressure chamber 87 from the non-pressure chamber 83, and a stem 90, extending slidably in pressure sealed relation through an opening 91 in said partition, is arranged to serve as the medium through which the diaphragm motor assemblage 71 cooperates with the diaphragm motor assemblage 70 to operate the stem 68.

A light compression spring 92, disposed in the brake cylinder pressure chamber 82, is arranged to cooperate with motor assemblage 70 to act on the diaphragm motor stack in opposition to pressure of fluid in the control reservoir pressure chamber 88 and in assist to the pressures of fluid in said brake cylinder pressure chamber and in the brake pipe pressure chamber 87.

The selector valve device 6, for sake of illustration, comprises a valve means in the form of such as a stem type slide 93 for selectively establishing communication between the chamber 22 in cut-off valve device 17 and either the atmosphere or the brake cylinder device 1. To accomplish this purpose, the slide valve 93 is disposed in slidably-guided sealing engagement with the cylindrical wall of a casing bore 94 for cooperation with ports 95 and 96 therein; the port 95 being connected to the brake cylinder device 1 by way of a branch of a brake cylinder pipe 97 which is also connected to the brake cylinder passage 61 in the brake controlling valve device 5 by way of the usual brake cylinder application control choke means 98, while the port 96 is connected to the chamber 22 in the cut-off valve device 17 by way of a pipe and passage 99. The valve 93 is arranged such that in the position in which it is shown in the drawing, the port 96 will be connected to the atmosphere by way of a port 100 and a clearance chamber 101 at one end of said valve, while such port 96 is blanked off from the port 95. An annular groove 102 in the outer periphery of valve 93 serves to communicate the port 96 with the port 95 when said valve is caused to assume an alternate position in which said port 96 is at the same time blanked off from chamber 101 and hence closed to the atmosphere.

For actuating the slide valve 93 in the selector valve device 6, motor means in the form of such as diaphragm motor assemblage 103 is included. For operative connection of the assemblage 103 with the valve 93, said valve may, as shown in the drawing, be formed integrally with a follower member 104 of said assemblage. A compression spring 105 disposed in the clearance chamber 101 is arranged to urge the valve 93 toward the position in which it is shown in the drawing defined by engagement of such as a projecting element 106 of the assemblage 103 with a casing shoulder 107.

For controlling and effecting actuation of the motor assemblage 103 and thereby the valve 93 against opposition of the spring 105, one face of the assemblage 103 is subject to brake pipe pressure in a brake pipe pressure chamber 108 open to the brake pipe 4 via a passage 109, while the opposite face of said assemblage 103 is subject to pressure of fluid in a volume chamber 110 which is open to the brake pipe 4 via the passage 109 and flow restricting means such as a choke 111.

*Operation*

Assume initially that all the passages and chambers in the brake apparatus as shown in the drawing are devoid of fluid under pressure; that the various parts of the apparatus are in the respective positions in which they are shown in the drawing; and, that it is desired to initially charge such apparatus. By way of the engineer's brake valve (not shown) on the locomotive, fluid under pressure will then be supplied to the brake pipe 4 and such fluid under pressure will flow therefrom into the passage 12 in the brake controlling valve device 5 on each car of the train. In each respective device 5 on any particular car of the train, fluid under pressure will flow from the passage 12 to the supply reservoir 2 by way of the inlet chamber 10 of the check valve device 7, the unseated check valve 8, and the outlet chamber 11 therein, the passage 13, choke 14, passage 15, and the pipe 16. Fluid under pressure thus supplied to the passage 12 will also flow to the control reservoir 3 by way of a respective branch of said passage 12, the control reservoir charging choke 28, the passage 27, the groove 23 in slide valve 18 of the cut-off valve device 17, the passage 25, and the pipe 26.

At the same time, fluid under pressure supplied to the brake pipe 4 will flow also by way of the passage 109 to the brake pipe pressure chamber 108 in the selector valve device 6 as well as from said passageway 109 via the choke 111 to the chamber 110. Whether or not, during the initial charging, sufficient differential in pressures is built up across the diaphragm motor assemblage 103 in the device 6 to shift the valve 93 is immaterial since at this time the pipe 97 will be devoid of fluid under pressure and therefore in either position of valve 93 the chamber 22 in the device 17 will remain connected to the atmosphere via said device 6. In the event, however, that the valve 93 should be shifted during initial charging to the position opposite to that in which it is shown in the drawing, subsequent stabilization of brake pipe pressure at its normal charge value will permit equalization of pressure in chambers 108 and 110 by flow through the choke 111 and the spring 105 will return said valve 93 to the position in which it is shown.

At the same time that fluid under pressure is thus supplied to the supply reservoir 2 by way of the passage 15 as described above, such fluid under pressure from the passage 15 will also flow to the chamber 72 in the service valve device 66 and to the chamber 47 in the quick service valve device 35, while fluid under pressure supplied to the control reservoir 3 by way of the passage 25 will flow also to the control reservoir pressure chamber 88 in said device 66. After the lapse of a period of time necessary to effect charging of the reservoirs 2 and 3 in the brake controlling valve device 5 and the chamber 110 in the selector valve device 6, the pressure of fluid in the brake pipe 4 will be stabilized at a normal value of such as seventy pounds preparatory to operation of the brake apparatus.

During such initial charging of the brake apparatus, the brake cylinder device 1 will remain vented to the atmosphere via the service valve device 66 which will remain in its release position in which it is shown in the drawing, as pressure of fluid in its brake pipe pressure chamber 87 is increased at a greater rate than in its control reservoir pressure chamber 88 due to the restriction imposed by choke 28 to charging flow to the control reservoir; the quick service valve device 35 will remain in its repose position while pressure of fluid in brake pipe pressure chamber 46 is increased at a greater rate than pressure of fluid in the supply reservoir pressure chamber 47, due to the restriction imposed by the choke 14 on charging flow to the supply reservoir by way of the charging check valve device 8 as well as restriction imposed by the choke 32 to any charging flow to the supply reservoir which may transpire by way of the passage 31, the groove 24 in the slide valve 18 of the cut-off valve device 17, the passage 15 and the pipe 16; the interlock valve device 51 will remain in the position in which it is shown in the drawing in absence of any brake cylinder pressure in its chamber 54; and the cut-off valve device 17 will remain in the position in which it is shown in the drawing with its control chamber 20 devoid of fluid under pressure by virtue of its connection to the atmosphere via passage 59, choke 60, passage 61, and chamber 77, passage 78, port 79, groove 80 and the passage 81 in the service valve device 66 in its release position.

*Application of the brakes*

In effecting a service application of the brakes, initiation of such application will be effected by manipulation of the engineer's brake valve on the locomotive to reduce pressure of fluid in the brake pipe 4. In the respective brake controlling valve device 5 on the first car or perhaps first several cars of the train, such reduction in brake pipe pressure will be experienced in the brake pipe pressure chamber 46 in the quick service valve device 35 by way of the brake pipe passage 12, while any considerable reduction in supply reservoir pressure resultant from flow of fluid under pressure from the supply reservoir 2 to the brake pipe 4 by way of the pipe 16, passage 15, groove 24 in slide valve 18 of the cut-off valve device 17 and the passage 31, is prevented by the restricted effect of the choke 32 connecting said passage 31 with the brake pipe via the passage 12. Such reduction in brake pipe pressure in the brake pipe pressure chamber 46 in the quick service valve device 35 relative to the slight reduction in supply reservoir pressure in chamber 47 therein will cause the supply reservoir pressure to preponderate over brake pipe pressure to the extent of such as seven-tenths of a pound, necessary to actuate the diaphragm motor assemblage 37 to move the slide valve 36 to its quick service position in which it contacts the end wall 50. In such quick service position of the slide valve 36, fluid under pressure will flow locally from the brake pipe 4 on the particular car or cars in which the quick service valve device 35 has thus responded, to the quick service volume chamber 42 and to the atmosphere, by way of the brake pipe passage 12, the quick service control choke 40, the passage 38, passage 43 in the slide valve 36 which will be in registry with said passage 38, ports 44 and the groove 45 in said slide valve, the passage 39 connected to the volume chamber 42 directly, and, at a lesser rate, to the atmosphere by way of said passage 39, the groove 58 in the slide valve 52 of the interlock device 51, passage 59, the choke 60, the brake cylinder passage 61, the annular passage 77 in the service valve device 66, the passage 78, ports 79 and groove 80 in the stem 68 of said service valve device, and the restricted passage 81. At the same time, such fluid under pressure withdrawn from the brake pipe by way of the quick service valve device 35 as supplied to the passage 59 will flow to the control chamber 20 in the cut-off valve device 17 and actuate slide valve 18 to its closed position defined by engagement of said slide valve with the end wall of chamber 33 to disestablish registry of grooves 23 and 24 with passages 25 and 31, respectively, to thereby disestablish communication of the control and supply reservoirs 3 and 2 with the brake pipe via such grooves, respectively.

Such quick service withdrawal of fluid under pressure locally from the brake pipe 4 to the quick service bulb 42 on the first car or on the first several cars of the train will cause a sufficient reduction in brake pipe pressure on the immediately succeeding car or cars which will operate the respective quick service valve devices thereon to rapidly propagate such quick service reduction in brake pipe pressure serially through the train from car to car. On each car, by virtue of the size of the quick service volume chamber 42 relative to the volume of the brake pipe 4 on such car, the reduction in brake pipe pressure resultant from the filling of said quick service volume chamber will amount to such as four or five pounds, which reduction, as realized in the brake pipe pressure chamber 87 in the service valve device 66, will cause control reservoir pressure in chamber 88 acting on the diaphragm motor assemblage 71 to preponderate over brake pipe pressure in chamber 87 sufficiently to effect unseating of the valve 67 by actuation of seat element 69 into engagement with said valve 67 through movement of stem 90, diaphragm motor assemblage 70 and stem 68. By unseating of valve 67, fluid under pressure from the supply reservoir 2 is permitted to flow to the brake cylinder device 1 by way of the pipe 16, the supply reservoir passage 15, the supply chamber 72 in the service valve device 66, the unseated supply valve 67, the port 74, the passage 77, passage 61, choke 98, and the pipe 97. Sealing engagement of the seat element 69 in the service valve device 66 with the valve 67 will prevent fluid under pressure thus supplied to the brake cylinder device 1 via the port 74 and the passage 77 from escaping to the atmosphere via the passage 78 in said seat element.

At the same time, fluid under pressure withdrawn from the brake pipe by way of the respective quick service valve device 35 will continue to flow via the passage 39, the groove 58 in the slide valve 52 of the interlock valve device 51, the passage 59, the choke 60, the passage 61, etc., as previously traced, to the brake cylinder device 1 until brake cylinder pressure, as experienced in the control chamber 54 of the interlock valve device 51 via the brake cylinder passage 61 attains a value of such as five pounds, whereupon the diaphragm 53 will actuate the slide valve 52 to its quick service cut-off position and disestablish communication between passages 39 and 59 and terminate any further withdrawal of fluid under pressure from the brake pipe via groove 58.

After the pressure of fluid in the brake pipe 4 becomes stabilized at a value determined by the engineer on the locomotive through manipulation of the brake valve on such locomotive, supply of fluid under pressure from the supply reservoir 2 to the brake cylinder device 1 on a particular car will be terminated when brake cylinder pressure as realized in the brake cylinder pressure chamber 82 in the service valve device 66 reaches a value commensurate with the reduced brake pipe pressure in chamber 87 of such service valve device. Such brake cylinder pressure in chamber 82, in acting on the diaphragm motor assemblage 70 in assist to brake pipe pressure in chamber 87 acting on the diaphragm motor assemblage 71 will actuate the stem 68 in opposition to control reservoir pressure in chamber 88 to permit the spring 76 to actuate the supply and release valve 67 into engagement with its seat 73 while remaining in engagement with seat element 69, thereby lapping off the brake cylinder passage 61 from the supply chamber 72 as well as from the release passage 78 in said seat element 69, to hold the desired pressure of fluid in passage 61 and hence in the brake cylinder device 1.

From the foregoing it will be apparent that any particular degree of brake cylinder pressure may be attained by operation of the service valve device 66 according to the degree of reduction in brake pipe pressure relative to control reservoir pressure, either initially or in subsequent graduated steps, up to a maximum brake cylinder pressure of such as fifty pounds as determined by equalization of the pressure of the supply reservoir 2 with that in the brake cylinder device 1 and corresponding to a reduction in brake pipe pressure to or below a full service value of such as fifty pounds.

During an application of the brakes as effected in response to a reduction in brake pipe pressure as above-described, pressure of fluid in the chamber 110 in the selector valve device 6 will equalize with pressure of fluid in the brake pipe 4 by way of the choke 111 and the passage and pipe 109.

*Graduated release of the brakes*

Following an application of the brakes, graduated release of the brakes in any desired degree and any number of desired steps may be effected by partial restoration in brake pipe pressure at less than a certain quick release rate as determined by manipulation of an engineer's brake valve on the locomotive designed for compatibility with the subject brake apparatus. When brake pipe pressure is thus increased at less than such quick release rate, fluid under pressure from the brake pipe will flow to the chamber 110 by way of the passage 109 and the choke 111 at such a rate as will preclude the realization of preponderance in brake pipe pressure in chamber 108 over that in chamber 110 acting on the diaphragm motor 103 sufficient to overcome the opposition of the spring 105 and move the slide valve 93 out of the position in which it is shown in the drawing. The chamber 22 in the cut-off valve device 17 will therefore remain vented to the atmosphere via the passage and pipe 99, port 96, chamber 101, and the port 100 in said device 6, and said cut-off valve device 17 consequently will remain in its cut-off position isolating the control reservoir 3 from the brake pipe.

At the same time, in each respective brake controlling valve device 5, such fluid under pressure thus supplied to the brake pipe 4 at a controlled rate less than its quick release rate will flow from the brake pipe by way of the passage 12 to the brake pipe pressure chamber 87 in the service valve device 66. When such brake pipe pressure in chamber 87, acting on the diaphragm motor assemblage 71 in assist to brake cylinder pressure in chamber 82 acting on the diaphragm motor assemblage 70, is thus increased sufficiently to overcome opposition of the control reservoir pressure in chamber 88, the diaphragm motor assemblages 70 and 71, interconnected by way of the stem 90, will actuate the stem 68 in the direction of said control reservoir pressure chamber 88 and cause the valve seat element 69 to leave the valve 67 and permit release of fluid under pressure from the brake cylinder device 1 to the atmosphere by way of the pipe 97, the choke 98, the passage 61, the passage 77, the port 74, the passage 78, port 79 and the groove 80 in the stem 68 of device 66, and the passage 81 open to the atmosphere.

When the brake cylinder pressure as experienced in the brake cylinder pressure chamber 82 in the service valve device 66 reduces to a value commensurate with the degree of restoration in brake pipe pressure in chamber 87 in said device, pressure of fluid in the control reservoir pressure chamber 88 acting on the diaphragm motor assemblage 71, through the medium of the stem 90 and the motor assemblage 70, will actuate the stem 68 to return seat element 69 into engagement with the supply and release valve 67 to hold the desired degree of brake cylinder pressure in the brake cylinder device 1.

Such reduction in brake cylinder pressure as effected by operation of the service valve device 66 responsively to restoration of brake pipe pressure may be effected in any number of desired steps and to any degree up to full release of the brakes corresponding to restoration in brake pipe pressure to its full normal value of such as seventy pounds, whereupon, brake cylinder pressure will be reduced to that of the atmosphere and the service valve device 66 will remain in its release position in which it is shown in the drawing.

During the early stages of restoration in brake pipe pressure for effecting a release of the brakes, brake pipe pressure as experienced in the chamber 46 in the quick service valve device 35 will be increased relative to supply reservoir pressure in chamber 47 sufficiently to permit the spring 48 to return the quick service valve device 35 to the position in which it is shown in the drawing preparatory to the effecting of a reapplication of the brakes.

During the final stages of a graduated release of the brakes, when the reducing brake cylinder pressure attains a value less than such as five pounds, such brake cylinder pressure as experienced in the control chamber 54 in the interlock valve device 51 will permit the spring 55 to return the slide valve 52 to its uppermost position in which it is shown in the drawing. In such position of the slide valve 52, communication between passages 39 and 59 is reestablished by way of the groove 58, and fluid under pressure from the quick service volume chamber 42 connected to passage 39 will flow thereby to the atmosphere at a controlled rate by way of said passage 59, the choke 60, the brake cylinder passage 61, the service valve device 66 in its release position, and the passage 81.

At the same time, fluid under pressure in the control chamber 20 of the cut-off valve device 17 is released by way of passage 59, choke 60, passage 61, service valve device 66 and passage 81. When pressure of fluid in chamber 20 is thus reduced to within a slight degree of atmospheric pressure, the spring 21 will cause the slide valve 18 to assume its open position in which it is shown in the drawing, wherein communication between the brake pipe passages 27 and 31 with the control and supply reservoir passages 25 and 15, respectively, is reestablished via the grooves 23 and 24, respectively.

At this time, the pressure of fluid in the brake pipe 4 will be substantially equal to its normal full-charge value of such as seventy pounds, so that the return of the charging valve device 17 to its charging position will permit fluid under pressure from said brake pipe to flow to the control and supply reservoirs 2 and 3, respectively, to make up for any deficiency in pressure of fluid which may exist therein, via respective flow paths as previously traced in connection with description of initial charging of the apparatus, it being appreciated that the supply reservoir will have been charged to within one and seven-tenths pounds of brake pipe pressure by way of the charging check valve device 7 at the time the cut-off valve device 17 returns to its charging position.

*Direct release of the brakes*

To effect a direct release of the brakes following an application thereof, fluid under pressure will be supplied to the brake pipe 4 by manipulation of the engineer's brake valve at a certain selected quick release rate which is greater than that employed for effecting a graduated release of the brakes, and such fluid under pressure as thus supplied rapidly to the brake pipe 4 as flowing to the selector valve device 6 in the first car on the train will cause brake pipe pressure in the chamber 108 therein to preponderate over the less rapidly increasing pressure of fluid in the chamber 110 supplied via choke 111, sufficiently to operate the diaphragm motor assemblage 103 for actuation of slide valve 93 to establish communication between the pipes 99 and 97 by registration of the groove 102 with ports 95 and 96. Thereupon, fluid under pressure from the brake cylinder device 1 will flow to the pressure chamber 22 in the cut-off valve device 17 by way of the pipe 97, the port 95 in selector valve device 6, the groove 102 in valve 93, the port 96, and the pipe and passage 99.

Upon supply of fluid under pressure from the brake cylinder device 1 to the pressure chamber 22 in the cut-off valve device 17 as above described, such fluid under pressure in chamber 22 by the spring 21 will be sufficient to effect return of the slide valve 18, against opposition of the pressure of fluid in the chamber 20 at the opposite side of the diaphragm 19, to its open position in which it is shown in the drawing defined by engagement of said diaphragm with the casting; it being appreciated that the pressure of fluid in the chamber 20 at this time will be substantially equal to the pressure of fluid in the chamber 22, the chamber 20 being constantly connected to the brake cylinder device 1 by way of the passage 59, the choke 60, the passage 61, the choke 98, and the pipe 97. When the valve 18 is thus caused to assume the position in which it is shown in the drawing, the groove 23 is brought into registry with the passages 25 and 27 and permits fluid under pressure from the control reservoir 3 to flow into the brake pipe 4 for equalization of pressures therein by way of the pipe 26, the passage 25, said groove 23, the passage 27, the choke 28, and, via check valve 29, the choke 30, and the passage 12.

Such equalization in pressures between the control reservoir 3 and the brake pipe 4 as experienced in the chambers 87 and 88 in the service valve device 66 via passages 12 and 25, respectively, promtly equalizes the pressure forces on the diaphragm motor assemblage 71 and permits brake cylinder pressure and the spring 92 in the brake cylinder pressure chamber 82 acting on the diaphragm motor assemblage 70 to actuate the stem 68 to its release position in which the attached seat element 69 leaves the supply and release valve 67 and thereby permits fluid under pressure from the brake cylinder device 1 to release to the atmosphere by way of the pipe 97, the choke 98, the passage 61, the port 74, the passage 78 in said seat element 69, the port 79, the groove 80 and the passage 81, until pressure of fluid in the brake cylinder device 1 is thereby reduced to that of the atmosphere.

During such direct release of fluid under pressure from the brake cylinder device 1 via the service valve device 66, once equalization between pressure of fluid in the control reservoir 3 and that of the brake pipe 4 has been attained, subsequent further increase in brake pipe pressure by virtue of flow of fluid under pressure to the brake pipe 4 via the brake valve device on the locomotive will cause charging of the control reservoir 3 to substantially the same degree by flow of fluid under pressure from said brake pipe to said control reservoir by way of the passage 12, the choke 28, the passage 27, the groove 23 in the valve 18 of the cut-off valve device 17, the passage 25 and the pipe 26 as pressure of fluid in said control reservoir is thus maintained substantially equal to that of brake pipe 4. A corresponding increase in supply reservoir pressure to that of the brake pipe 4 also will be realized by virtue of flow of fluid under pressure to the supply reservoir 2 from the brake pipe 4 by way of the passage 12, the supply reservoir charging check valve device 7, passage 13, the charging choke 14, the passage 15, the pipe 16, as well as by way of said passage 12, the choke 32, the passage 31, the groove 24 in the slide valve 18 of cut-off valve device 17, said passage 15, and said pipe 16.

Also during such direct release of fluid under pressure from the brake cylinder device 1 by way of the service valve device 66 as described, fluid under pressure in the control chamber 20 in the cut-off valve device 17 will be reduced to that of the atmosphere together with that in the brake cylinder device 1 by way of the passage 59, the choke 60, the passage 61, and the service valve device 66 as previously traced.

Also during direct release of fluid under pressure from the brake cylinder device 1 by the service valve device 66, when brake cylinder pressure as experienced in the brake cylinder pressure chamber 54 in the interlock valve device 51 via the passage 61 reduces to the extent of such as five pounds, the spring 55 in chamber 56 will return the slide valve 52 to the position in which it is shown in the drawing to permit fluid under pressure bottled up in the quick service volume chamber 42 to release to the atmosphere by way of the passage 39, the groove 58 in said slide valve 52, the passage 59, the choke 60, the passage 61, the service valve device 66 in its release position, and the passage 81. As in the case of a graduated release of the brakes, the quick service valve device 35 will have returned to the position in which it is shown in the drawing upon substantial equalization of brake pipe pressure with supply reservoir pressure.

When brake pipe pressure as thus being increased at a quick release rate is stabilized at its normal full charge value such as seventy pounds, pressure of fluid in the chamber 110 in the selector valve device 6 will have the opportunity to equalize with the brake pipe pressure in chamber 108 by flow of fluid under pressure from the brake pipe via passage 109 and the choke 111, whereupon the spring 105 will return the slide valve 93 to the position in which it is shown in the drawing wherein the ports 95 and 96 are blanked off from one another and the latter port is open to the chamber 101 and thereby to the atmospheric port 100. Fluid under pressure from the pressure chamber 22 in the cut-off valve device 17 will then escape to the atmosphere by way of the pipe and passage 99, said port 96, the chamber 101 and the port 100 in the selector valve device 6. Such release of fluid under pressure from the pressure chamber 22 in the cut-off valve device 17 at this time will have no effect on the position of said device 17 since its chamber 20 will be substantially devoid of fluid under pressure and said cut off valve device 17 will remain in its charging position in which it is shown on the drawing.

Initially during such flow of fluid under pressure from the control reservoir 3 to the brake pipe 4 for equalization of pressures therein as initiated on the first car or cars on the train by operation of the selector valve device 6, pressure of fluid will be increased thereby locally on such car or cars at a rate which will be sufficient to cause operation of the selector valve device 6 on the following car or several cars of the train to cause fluid under pressure in the control reservoir thereon to be emptied into the brake pipe on such cars and this in turn will create a local build-up in brake pipe pressure at a rate sufficient to operate following selector valve devices and be propagated from car to car back through the train with the resultant realization of a rapid initiation of release of brakes on the cars throughout the length of the train.

If, at the time of initiation of a direct release of the brakes, brake pipe pressure is less than supply reservoir pressure, such as during existence of an over-reduction in brake pipe pressure to a value below that at which the supply reservoir equalizes with the brake cylinder device, then, when the slide valve 18 of cut-off valve device 17 is actuated to its uppermost position by pressurization of chamber 22 via device 6, in addition to equalization of control reservoir and brake pipe pressures by flow via groove 23 as previously described, fluid under pressure will also flow from the supply reservoir 2 to the brake pipe 4 at a limited rate by way of the pipe 16, passage 15, groove 24 in said slide valve 18, passage 31, choke 32 and passage 12. Such flow of fluid under pressure at this time will aid to some degree the creation of the brake pipe pressure wave which is created by flow of control reservoir fluid into the brake pipe and hence will tend to hasten operation of the respective selector valve devices 6 on the cars of the train and hence hasten the realization of a brake release on such train.

Having now described the invention, what we claim as new and desire to secure by Letters Patent, is:

1. In a fluid pressure railway car brake apparatus, in combination, a normally charged brake pipe; a brake cylinder device; a normally charged supply reservoir; a normally charged control reservoir; brake cylinder supply and release valve means for controlling selective communication between said brake cylinder device and either said supply reservoir or the atmosphere; movable abutment means operatively connected to said brake cylinder supply and release valve means and subject to control reservoir pressure acting in opposition to brake pipe and brake cylinder pressures, said movable abutment means in cooperation with said brake cylinder supply and release control valve means being responsive to reduction in brake pipe pressure relative to control reservoir pressure to effect a brake application by supply of fluid under pressure from said supply reservoir to said brake cylinder device, being responsive to degrees of restoration in brake pipe pressure relative to control reservoir pressure following a brake application to effect corresponding degrees of reduction in brake cylinder pressure by partial release of fluid under pressure from said brake cylinder device, and being responsive to equalization of control reservoir pressure with brake pipe pressure following a brake application to effect reduction in brake cylinder pressure to that of the atmosphere by complete release of fluid under pressure from said brake cylinder device; reservoir isolating valve means, normally closed during a brake application, for controlling communication between said control reservoir and said brake pipe; and means responsive to rate of restoration in brake pipe pressure above a certain degree to effect opening of said reservoir isolating valve means for permitting flow of fluid under pressure from said control reservoir into said brake pipe whereby there results an equalization of brake pipe and control reservoir pressures for direct release of the brakes and a sudden local build-up in brake pipe pressure which may be propagated by similar equipment on each car back through a train of such cars.

2. In a fluid pressure railway car brake apparatus, in combination, a normally charged brake pipe; a brake cylinder device; a normally charged supply reservoir; a normally charged control reservoir; a brake cylinder supply and release valve means for controlling selective communication between said brake cylinder device and either said supply reservoir or the atmosphere; movable abutment means operatively connected to said brake cylinder supply and release valve means and subject to control reservoir pressure acting in opposition to brake pipe and brake cylinder pressures; said movable abutment means in cooperation with said brake cylinder supply and release control valve means being responsive to reduction in brake pipe pressure relative to control reservoir pressure to effect a brake application by supply of fluid under pressure from said supply reservoir to said brake cylinder device, being responsive to degrees of restoration in brake pipe pressure relative to control reservoir pressure following a brake application to effect corresponding degrees of reduction in brake cylinder pressure by partial release of fluid under pressure from said brake cylinder device, and being responsive to equalization of control reservoir pressure with brake pipe pressure following a brake application to effect reduction in brake cylinder pressure to that of the atmosphere by complete release of fluid under pressure from said brake cylinder device; isolating valve means actuable to open and closed positions to open and close, respectively, said control reservoir to said brake pipe; bias means urging said isolating valve means toward its open position; actuator means operatively connected to said isolating valve means and subject opposingly to pressure of fluid in first and second control chambers whereby, upon pressurization of said first control chamber while said second control chamber is devoid of fluid under pressure, said isolating valve means is actuated against opposition of said bias means to its closed position, and whereby, either upon subsequent equalization of pressures in said first and second control chambers or upon reduction in pressure of fluid under pressure in said first control chamber, said bias means will return said isolating valve means to its closed position; conduit means connecting said first control chamber to said brake cylinder device constantly during a brake application to maintain said first control chamber pressurized for holding the isolating valve means closed; and a fluid pressure selector valve device comprising valve means controlling selective communication between said second control chamber and either said brake cylinder device or the atmosphere, said selector valve device normally connecting said second control chamber to the atmosphere and being responsive, following a brake application, to restoration of brake pipe pressure above a certain rate to connect said second control chamber to said brake cylinder device for return of said isolating valve means to its open position to permit flow of fluid under pressure from said control reservoir to said brake pipe whereby there results an equalization of brake pipe and control reservoir pressures.

3. The combination as set forth in claim 2, further including choke and check valve means arranged to impose, on flow of fluid under pressure between said brake pipe and said control reservoir via said isolating valve means when open, a certain degree of restriction during charging flow to said control reservoir and a lesser degree of restriction during equalizing flow of fluid under pressure from said control reservoir to said brake pipe.

4. The combination as set forth in claim 2, further including a quick service valve device operable upon a slight initial reduction in brake pipe pressure below its normal charge value to connect said brake pipe to said first control chamber for supply of fluid under pressure thereto, to effect initial closure of said isolating valve means.

5. The combination as set forth in claim 4, further including conduit means connecting said first control chamber to said brake cylinder device and a valve device operable by brake cylinder pressure to close said first control chamber to said brake pipe upon attainment of brake cylinder pressure above a certain value.

6. In a fluid pressure brake apparatus, the combination of a brake pipe, a brake cylinder, a control reservoir, service valve means controlled by control reservoir pressure acting in opposition to brake pipe pressure and brake cylinder pressure and responsive to a reduction in brake pipe pressure relative to control reservoir pressure to provide in the brake cylinder fluid at a pressure substantially proportionate to the extent of such reduction and normally responsive to a subsequent increase in brake pipe pressure of any desired extent relative to control reservoir pressure to provide in the brake cylinder fluid at a reduced pressure according to the extent of such increase for providing graduated release of brake cylinder pressure, other valve means normally operative while the brake cylinder is charged with pressure fluid to close a fluid pressure communication via which fluid under pressure may be released from the control reservoir, and means controlled by rate of increase in brake pipe pressure and operative if brake pipe pressure is increased at a rate exceeding a preselected rate while the brake cylinder is charged with pressure fluid to cause said other valve means to operate to open said communication, whereby whenever brake pipe pressure is increased at a rate not exceeding said preselected rate control reservoir pressure will not be reduced and said service valve means will provide graduated release of brake cylinder pressure according to the extent of such increase and whenever brake pipe pressure is increased at a rate exceeding said preselected rate control reservoir pressure will be reduced via said communication and cause said service valve means to effect a complete release of brake cylinder pressure irrespective of the degree of such increase in brake pipe pressure.

7. In a fluid pressure brake apparatus, the combination of a brake pipe, a brake cylinder, a control reservoir, service valve means controlled by control reservoir pressure acting in opposition to brake pipe pressure and brake cylinder pressure and responsive to a reduction in brake pipe pressure relative to control reservoir pressure to provide in the brake cylinder fluid at a pressure substantially proportionate to the extent of such reduction and normally responsive to a subsequent increase in brake pipe pressure of any desired degree relative to control reservoir pressure to provide in the brake cylinder fluid at a reduced pressure according to the extent of such increase for providing graduated release of brake cylinder pressure, other valve means controlled by brake cylinder pressure acting in opposition to pressure of fluid in one chamber and a bias pressure for controlling a communication through which fluid under pressure may be released from the control reservoir into the brake pipe, and valve means controlled by brake pipe pressure acting in opposition to another bias pressure and pressure of fluid in another chamber having restricted connection with the brake pipe and operative when brake pipe pressure is increased at a rate not exceeding the flow capacity of said restricted connection to vent said one chamber, whereby said communication will be closed by brake cylinder pressure during a brake application, the last introduced valve means being operative when brake pipe pressure is increased at a rate exceeding the flow capacity of said restricted connection to connect the brake cylinder to said one chamber for causing said other valve means to operate to open said communication thereby to so reduce control reservoir pressure by flow into the brake pipe as to cause said service valve means to effect a complete direct release of brake cylinder pressure irrespective of the degree of such increase in brake pipe pressure.

References Cited in the file of this patent

UNITED STATES PATENTS

| | | |
|---|---|---|
| 2,021,798 | McCune | Nov. 19, 1935 |
| 2,215,347 | Cook et al. | Sept. 17, 1940 |
| 2,661,248 | Keller | Dec. 1, 1953 |
| 2,707,134 | Cook | Apr. 26, 1955 |